3,099,535
METHOD FOR RECOVERING SULPHUR
Masanori Maezawa, 28 5-chome, Hattorihonmachi, and Taketoshi Kuragano, 703 Hozumi, both of Toyonaka City, Japan
No Drawing. Filed Dec. 30, 1960, Ser. No. 79,515
Claims priority, application Japan Mar. 6, 1957
13 Claims. (Cl. 23—225)

This invention relates to a method of recovering pure sulphur from hydrogen sulphide contained in such fuel gas as a coal gas, oil gas or producer gas or mixed with air.

The Seaboard process, Alkazid process and Girbitol process has often been used as conventional desulphurizing processes.

In such process, first of all, when a specific absorbing liquid is trickled from the top of an absorbing tower and a non-desulphurized crude gas is introduced from the bottom of the tower, they will come into contact with each other in countercurrents, and hydrogen sulphide will move into the absorbing liquid and will come out of the bottom of the absorbing tower. Then, when this liquid is trickled from the top of a regenerating tower and air is introduced from the bottom of this tower, they will come into contact with each other in countercurrents, and hydrogen sulphide will move into air from the liquid due to the partial pressure difference. Thus, a mixed gas of hydrogen sulphide and air will be discharged from the top of the regenerating tower. In such case, as the hydrogen sulphide will be discharged as it is, it will have such defects, as, affecting the health of human beings and of corroding buildings and structures.

Further, hydrogen sulphide in the waste gas of a plant in the chemical industry using hydrogen sulphide is adsorbed by water or alkalis. However, such process is undesirable because the waste water will be polluted. In recovering sulphur by the combustion process, a costly apparatus will be required. Such process is not thought to be so economically advantageous.

The present invention has been conceived, studied and completed to eliminate such defects and is to provide a new method of industrially and advantageously recovering pure sulphur from hydrogen sulphide. Its subject matter is a sulphur recovering method characterized in that hydrogen sulphide is converted into sulphur by being catalytically oxidized by the action of air or oxygen in using an alkaline aqueous solution, or an aqueous solution of a catalyst, and the sulphur is economically and advantageously separated and recovered. Such catalysts are picric acid, nitro phenols, dinitro phenols and trinitro benzoic acids presenting a remarkable catalytic action among organic compounds represented by the general formulae $R \cdot (OH) \cdot (NO_2)_n$ and $R \cdot (COOH) \cdot (NO_2)_n$ wherein R is an aryl radical and $n$ is a positive integer.

For the catalyst solution is used (1) an alkaline aqueous solution of said organic compound, (2) an aqueous solution of an alkali salt of said organic compound or (3) a solution prepared by adding the said organic compound or its salt to a circulating solution in a Seaboard desulphurizer used already in many gas plants. The proper concentration of the catalyst solution is to contain 0.02 to 5% by weight of said organic compound.

The oxidization of hydrogen sulphide into sulphur in the present method is a catalytic reaction in which oxygen does not directly react with the hydrogen sulphide. It is considered that, in the solution, the nitro radical of said organic compound in an activated form will be subjected to both reduction by hydrogen sulphide, and oxidation by oxygen and that the hydrogen sulphide will be converted into sulphur by the reversible oxidation-reduction reaction of said redox system. In the scientific field today, there is not yet any theory that can explain the detailed processes of the catalytic oxidation reaction mechanism of said organic compound. However, as a result of our researches, it has been found that the substance presenting the catalytic oxidation reaction mechanism of said organic compound. However, as a result of our researches, it has been found that the substance presenting the catalytic action is not the said organic compound itself, but that the redox system between a nitroso compound and a hydroxylamino compound which are intermediate reduction substance produced naturally in case a gas containing hydrogen sulphide comes into contact with the catalytic liquid plays an important part. Further, the —OH radical or —COOH radical in said organic compound acts as a hydrophilic radical to only help the catalyst to easily become watersoluble. From the industrially economical point of view, such organic compounds have been selected.

The processes in which hydrogen sulphide is absorbed by such catalytic liquid and is oxidized into sulphur in turn are exemplified as follows:

Absorbing process:

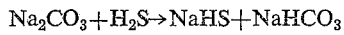

Regenerating process:

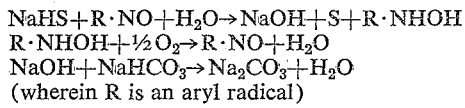

(wherein R is an aryl radical)

Therefore, if these reactions are singly shown, they will be

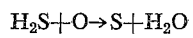

Such a catalyst is not to act as a direct absorbent for hydrogen sulphide but is to play a role of catalytic oxidization for the hydrogen sulphide that has been absorbed and moved into the solution by an aqueous solution of sodium carbonate $Na_2CO_3$, sodium bicarbonate $NaHCO_3$, sodium hydroxide NaOH or ammonia $NH_3$. In case hydrogen sulphide and oxygen are simultaneously contained in the gas to be washed, the said absorbing reaction and regenerating reaction will take place simultaneously. In case only hydrogen sulphide but no oxygen is contained in the gas to be washed, only the absorbing reaction will first occur in the absorbing tower and then, only after the foul solution which has absorbed the hydrogen sulphide meets oxygen in the regenerating tower, the regenerating (oxidizing) reaction will be caused. There is a feature in the fact that the absorbing and regenerating processes can occur either simultaneously, or separately.

Now, when a gas containing hydrogen sulphide and oxygen, or its mixed gas with air are brought into contact with each other by a method wherein they are introduced from bottom of an absorbing tower and are brought into contact with each other in countercurrents by trickling the said catalytic liquid from the top of the absorbing tower, a method wherein an absorbing tower is filled with said catalytic liquid and the gas containing hydrogen sulphide and oxygen or its mixed gas with air are introduced from the bottom of the tower so as to pass through the tower as bubbles or any other proper method, the hydrogen sulphide in this mixed gas will be catalytically oxidized by the accompanying oxygen, will be converted into pure sulphur, and will come to be suspended in the solution. When the sulphur thus suspended in the solution is filtered by a proper method, pure sulphur will be recovered. If a gas containing hydrogen sulphide but no oxygen is mixed with a proper amount of air or oxygen before or when it comes into contact with said catalytic liquid and is then brought into contact with the catalytic liquid, the hydrogen sulphide will be catalytically oxidized and will be converted into sulphur and the sulphur will be thus recovered simultaneously with the desulphurization of the gas. Further, if a mixed gas containing hydrogen sulphide but neither oxygen nor air is brought into contact with the catalytic liquid by any proper method so that the catalytic liquid may first absorb the hydrogen sulphide and then the catalytic liquid which has thus absorbed the hydrogen sulphide is brought into contact with oxygen or air by any proper method, the hydrogen sulphide which has been absorbed in the catalytic liquid will be catalytically oxidized into sulphur and the sulphur will be separated and recovered.

This catalytic reaction proceeds so easily at both high and normal temperatures that it is not at all necessary to take care of the temperature for treating each gas containing hydrogen sulphide and the catalytic liquid. Further, as this reaction is a catalytic reaction, there is, in fact, no variation of the catalyst at all. Only the small portion of the catalyst reduced by the mechanical loss of the reaction chamber itself, and escaping out of the system by accompanying the sulphur filtered and recovered by the filtering operation, may be supplemented. Therefore, the expense due to the consumption of the catalyst may be small. Further, in the present method, no hydrogen sulphide will be dissipated and discharged into the atmosphere. Therefore, the present method has not only an advantage of maintaining the health of human bodies but also there is no fear of corroding buildings and structures. In the present method, such violent toxicants as arsenic compounds in the Thylox process are not used, no ammonia will be dissipated in air, the operation is very easy; the recovering apparatus may be enough with a simple gas-liquid contact apparatus, the reaction proceeds at the normal temperature under the normal pressure, such hydrogen cyanide, organic sulphur compounds and carbon doxide as often accompany hydrogen sulphide give no obstruction to the present reaction at all; no metallic impurities are contained in the recovered sulphur and therefore pure sulphur of a high grade can be recovered economically and advantageously. The sulphur suspended in the catalytic liquid in the present method has no influence on the present reaction.

Examples of the present method shall be described in the following:

*Example 1*

One liter of a catlaytic liquid containing 1 g. of picric acid and 10 g. of sodium carbonate was put in a glass tube 50 mm. in the inner diameter. When a mixed gas of air and hydrogen sulphide, the rate of content of the hydrogen sulphide being 2 g./m.$^3$, was introduced into the tube from the bottom at a rate of 1 liter/min. so as to be well in contact with the catalytic liquid, sulphur was deposited in a powdery form in the catalytic liquid and no hydrogen sulphide was discharged at all from the top part of the tube. In case the amount of the treated mixed gas was 900 liters, the amount of sulphur recovered after the reaction was 1.6 g. (the calculated amount of the recovered sulphur being 1.7 g.). The purity of the sulphur was 99.5 to 100%.

*Example 2*

A glass tube 30 mm. in the inner diameter was charged irregularly to a height of 60 cm. with glass Raschig rings 8 mm. in the outer diameter, 6 mm. in the inner diameter and 10 mm. long. When a waste gas containing hydrogen sulphide as discharged from the top of the regenerating tower of a Seaboard desulphurizer, the rate of content of hydrogen sulphide being 2.03 g./m.$^3$, was introduced from the bottom of the tube at a rate of 3 liters/min. and a catalytic liquid was trickled thereon from the top of the tube at a rate of 0.2 liter/min., no hydrogen sulphide was contained at all in the waste gas discharged from the top of the tube. The catlaytic liquid coming out of the bottom of the tube was fed unchanged to the top of the tube and was circulated. In collecting sulphur, a part of the circulating catalytic liquid was withdrawn and was filtered to separate the suspended sulphur. The filtrate was returned to the circulating liquid. The catalytic liquid used here had metanitrophenol dissolved at a rate of 1 g./liter of the circulating liquid in the Seaboard desulphurizer. 1.5 g. of sulphur were recovered from 1 m.$^3$ of the gas thus treated. The purity was 99.7%.

*Example 3*

A gas prepared by mixing air at a rate of 0.2 m.$^3$:m.$^3$ of a gas consisting of 50% methane and 50% carbon dioxide as containing hydrogen sulphide, the rate of content of hydrogen sulphide being 3 g./m.$^3$, was introduced at a rate of 260 m.$^3$/hr. from the lower part into a tower 610 mm. in diameter and 7 m. high as charged with wooden hurdles and an aqueous solution of 0.1% 1,3,5-trinitrobenzoic acid and 3% sodium carbonate was trickled at a rate of 2 m.$^3$/hr. from the top of the tower. The liquid coming out of the bottom of the tower was fed to the top of the tower and was circulated. After operation of 5 hours, the circulating liquid was filtered; 3.3 kg. of pure sulphur were obtained. In this case, the mixed gas coming out of the top of the tower did not contain any hydrogen sulphide at all.

*Example 4*

A coal gas containing hydrogen sulphide at a rate of content of 6 g./m.$^3$ was introduced at a rate of 15 m.$^3$/hr. from the bottom part into an absorbing tower 6 inches in inside diameter and 1 m. high as charged irregularly with Raschig rings 15 mm. long and a catalytic liquid consisting of 4% sodium carbonate and 0.1% picric acid was trickled thereon from the top of the tower at a rate of 0.24 m.$^3$/hr. The coal gas coming out of the top of the absorbing tower contained no hydrogen sulphide. The liquid coming out of the bottom of the absorbing tower was trickled at a rate of 0.24 m.$^3$/hr. from the top part of a regenerating tower 8 inches in the inner diameter and 2 m. high as charged irregularly with Raschig rings 15 mm. long and air was introduced at a rate of 30m.$^3$/hr. from the lower part of the tower. No hydrogen sulphide was seen to be contained in the waste air coming out of the top of the regenerating tower. Further, the liquid coming out of the bottom part of the tower was fed to the absorbing tower and was trickled into the absorbing tower; and was thus circulated. When 500 m.$^3$ of the coal gas were treated, 2.4 kg. of pure sulphur were recovered.

This application is a continuation-in-part of application Serial No. 713,802, filed February 7, 1958, now abandoned.

What I claim is:

1. In a process of removing the sulphur of hydrogen sulphide from a hydrogen sulphide containing gas by catalytically oxidizing the hydrogen sulphide, the improvement which comprises contacting the gas and an oxygen-containing medium with an aqueous alkaline liquid containing a catalyst compound selected from the group consisting of $$R \cdot (OH) \cdot (NO_2)_n \text{ and } R \cdot (COOH) \cdot (NO_2)_n$$

wherein R stands for aryl and $n$ is an integer from 1 to 3 and the alkalimetal salts thereof.

2. A process as claimed in claim 1, wherein said medium is air.

3. A process as claimed in claim 1, wherein said catalyst compound is picric acid.

4. A process as claimed in claim 1, wherein said catalyst compound is 1,3,5-trinitrobenzoic acid.

5. A process as claimed in claim 1, wherein said catalyst compound is a nitrophenol.

6. A process as claimed in claim 1, wherein said catalyst compound is a dinitrophenol.

7. A process as claimed in claim 1, wherein said catalyst compound is a trinitrobenzoic acid.

8. A process as claimed in claim 1, wherein the liquid contains an alkali selected from the group consisting of alkali metal carbonate, alkali metal bicarbonate, alkali metal hydroxide and ammonia.

9. A process as claimed in claim 1, wherein the concentration of said catalyst in said liquid is about between 0.02–5% by weight.

10. A process as claimed in claim 1, wherein said oxygen containing medium is in gaseous state and said catalystic liquid is trickled down through a tower while the hydrogen sulphide containing gas and said oxygen containing medium in gaseous state are conducted upwardly through said tower in countercurrent to said catalytic liquid whereby the hydrogen sulphide is catalytically oxidized to form pure sulphur which is suspended in the liquid, whereafter said pure sulphur is recovered by filtration.

11. A process as claimed in claim 1, wherein the oxygen containing medium is in gaseous state and the catalytic liquid is placed in a vessel through which the gas containing hydrogen sulphide and the oxygen containing gaseous medium are conducted to rise in the form of bubbles whereby the hydrogen sulphide is catalytically oxidized to form pure sulphur which is suspended in the liquid, whereafter said pure sulphur is recovered by filtration.

12. In a process of removing the sulphur of hydrogen sulphide from a hydrogen sulphide containing gas by catalytically oxidizing the hydrogen sulphide, the improvement which comprises trickling a catalytic aqueous alkaline liquid containing a catalyst compound selected from the group consisting of $$R \cdot (OH) \cdot (NO_2)_n \text{ and } R \cdot (COOH) \cdot (NO_2)_n$$

wherein R stands for aryl and $n$ is an integer from 1 to 3 and the alkalimetal salts thereof, downwardly through a tower, passing the hydrogen sulphide containing gas upwardly through said tower in countercurrent to the liquid, whereby the catalytic liquid absorbs the hydrogen sulphide, and thereafter trickling the catalytic liquid with absorbed hydrogen sulphide down through a regeneration tower while passing an oxygen containing gaseous medium upwardly through the regeneration tower in countercurrent to the liquid.

13. In a process of removing the sulphur of hydrogen sulphide from a hydrogen sulphide containing gas by catalytically oxidizing the hydrogen sulphide, the improvement which comprises trickling a catalytic aqeous alkaline liquid containing a catalyst compound selected from the group consisting of $$R \cdot (OH) \cdot (NO_2)_n \text{ and } R \cdot (COOH) \cdot (NO_2)_n$$

wherein R stands for aryl and $n$ is an integer from 1 to 3 and the alkalimetal salts thereof through an absorption tower while passing the hydrogen sulphide containing gas upwardly through said tower in countercurrent to said liquid, whereby the catalytic liquid absorbs hydrogen sulphide from said gas and thereafter bubbling an oxygen containing gaseous medium through said catalytic liquid with the hydrogen sulphide absorbed therein.

References Cited in the file of this patent
UNITED STATES PATENTS

| | | |
|---|---|---|
| 1,313,370 | Datta | Aug. 19, 1919 |
| 1,937,196 | Gollmar | Nov. 28, 1933 |